(12) United States Patent (10) Patent No.: US 8,631,955 B2
Fleetwood (45) Date of Patent: Jan. 21, 2014

(54) ELECTRICAL SERVICE ASSEMBLY AND CONNECTING SYSTEM FOR MOUNTING SAME IN BUILDING STRUCTURE WALL

(76) Inventor: Shane J. Fleetwood, Bloomington, IN (US)

(*) Notice: Subject to any disclaimer, the term of this patent is extended or adjusted under 35 U.S.C. 154(b) by 1245 days.

(21) Appl. No.: 12/454,903

(22) Filed: May 26, 2009

(65) Prior Publication Data

US 2010/0300009 A1    Dec. 2, 2010

(51) Int. Cl.
*H02G 3/08* (2006.01)
(52) U.S. Cl.
USPC ............................................ 220/3.5
(58) Field of Classification Search
USPC ......... 220/3.5, 3.3, 3.9, 3.92, 3.94, 4.02, 3.8, 220/476, 477; 174/481, 50, 58, 53, 66, 61; 312/245, 242
See application file for complete search history.

(56) References Cited

U.S. PATENT DOCUMENTS

| | | | |
|---|---|---|---|
| D243,699 S | 3/1977 | Plummer | |
| 4,532,574 A | 7/1985 | Reiner et al. | |
| 4,615,113 A * | 10/1986 | Fennel | 174/50 |
| 5,296,647 A * | 3/1994 | Banker | 174/58 |
| 5,638,256 A | 6/1997 | Leach et al. | |
| 5,839,594 A | 11/1998 | Barbour | |
| 5,841,068 A | 11/1998 | Umstead et al. | |
| 6,046,904 A | 4/2000 | Kubat | |
| 6,079,677 A | 6/2000 | Daoud | |
| 6,421,229 B1 | 7/2002 | Campbell et al. | |
| 6,516,966 B1 | 2/2003 | Leonard | |
| 6,768,055 B1 * | 7/2004 | Gorin | 174/50 |
| 6,774,307 B2 | 8/2004 | Kruse et al. | |
| 6,958,447 B1 * | 10/2005 | Thornton et al. | 174/58 |
| 7,098,399 B1 | 8/2006 | Gretz et al. | |
| 7,173,186 B1 | 2/2007 | Hageman | |

* cited by examiner

*Primary Examiner* — Andrew Perreault
(74) *Attorney, Agent, or Firm* — Liell & McNeil

(57) ABSTRACT

An electrical service assembly for mounting in a building structure wall includes an entrance panel housing, a power meter base and a connecting system connecting the power meter base to the entrance panel housing. The connecting system includes a body having a first surface abutting the power meter base, a second surface abutting the entrance panel housing and a thickness between the first surface and the second surface whereby the body spaces the power meter base from the entrance panel housing. The connecting system further includes a clamping mechanism, such as a set of fasteners, clamping the power meter base, the entrance panel housing and the body together in an assembly configuration where a wiring through-hole formed in the entrance panel housing is in register with a wiring through-hole formed in the power meter base.

10 Claims, 4 Drawing Sheets

ELECTRICAL SERVICE ASSEMBLY AND CONNECTING SYSTEM FOR MOUNTING SAME IN BUILDING STRUCTURE WALL

TECHNICAL FIELD

The present disclosure relates generally to electrical service assemblies having a power meter base and an entrance panel housing, and relates more particularly to a connecting system which enables mounting a preassembled electrical service assembly having a power meter base and an entrance panel housing within a building structure wall.

BACKGROUND

Most modern electrified buildings utilize a power meter housed in a unit known generally as a power meter base, and a separate entrance panel, which together are used for supplying and monitoring electrical power supplied to the building from an electrical grid. In a conventional set-up, the power meter and base are a stand-alone unit which is mounted at an exterior of the building structure, enabling utility personnel or building owners, users, etc., to take meter readings without needing to enter the building. The entrance panel is typically a separate stand-alone unit, mounted in a housing which is positioned inside the building structure and includes mounts for a plurality of circuit breakers, etc., well known in the art. Electrical wiring connects the power meter to the entrance panel, typically by being passed through a wall of the building structure.

Electricians or other construction personnel typically mount the power meter base and the entrance panel housing in relatively close proximity to each other, on opposite sides of a wall of the building structure. Installing the electrical service in a building or replacing the power meter base, entrance panel or various components, can involve extensive carpentry, electrical wiring, and other labor intensive tasks. For example, when installing electrical service in a new building structure, it is typical for the technician to separately mount each of the power meter base and entrance panel housing, then connect the necessary wiring between the two. This tends to take significant skill and time to provide both a sound mounting for the various components and a visually attractive finished product. As alluded to above, even for skilled technicians these tasks can require a substantial amount of time. In the past, combination meter/breaker panels have been proposed. U.S. Pat. No. 6,421,229 B1 to Campbell et al. discloses one such system. Campbell et al. provide a meter/breaker arrangement having separate covers for a meter side and a breaker side. Various features for apparently inhibiting intrusion of water into either of the breaker side or meter side are included. Campbell et al. appears best suited for installations where a meter and breaker panel are to be accessible from the same side of a wall of a building structure, and in particular the outside. Thus, while Campbell et al. may have certain applications, various types of building structures such as residential homes, often require that the entrance panel and/or breakers be positioned on the inside of the building structure, while the power meter and power meter base are positioned on the outside of the building structure. Thus, Campbell et al. would be unsuited to such an application.

SUMMARY

In one aspect, an electrical service assembly includes an entrance panel housing adapted to mount the electrical service assembly to a building structure wall, the entrance panel housing having a plurality of entrance panel sidewalls, an entrance panel cover and an entrance panel back wall. The entrance panel back wall is positioned opposite the entrance panel cover and includes a first wiring through-hole formed therein. The electrical service assembly further includes a power meter base having a plurality of base sidewalls, a base cover defining a meter opening and a base back wall positioned opposite the base cover and having a second wiring through-hole formed therein. The electrical service assembly also includes a connecting system connecting the power meter base to the entrance panel housing. The connecting system includes a body having a first surface abutting the base back wall, a second surface opposite the first surface and abutting the entrance panel back wall and a thickness between the first surface and the second surface whereby the body spaces the power meter base from the entrance panel housing. The connecting system further includes a clamping mechanism clamping the power meter base, the entrance panel housing and the body together in an assembly configuration where the first wiring through-hole and the second wiring through-hole are in register with one another.

In another aspect, a building structure wall includes a first elongate structural member and a second elongate structural member spaced from the first elongate structural member and oriented parallel therewith, the first elongate structural member and the second elongate structural member defining a vertical direction. An electrical service assembly is positioned between the first elongate structural member and the second elongate structural member and extends in a horizontal direction between a first side of the building structure wall and a second side of the building structure wall which is opposite the first side. The electrical service assembly includes an entrance panel housing mounted to at least one of the first elongate structural member and the second elongate structural member and has a first wiring through-hole formed therein and an entrance panel cover positioned at the first side of the building structure wall. The electrical service assembly further includes a power meter base having a second wiring through-hole formed therein and a base cover defining a meter opening and being positioned at the second side of the building structure wall, and a connecting system connecting the power meter base to the entrance panel housing. The connecting system includes a body abutting the power meter base and abutting the entrance panel housing and having a body thickness whereby the body spaces the power meter base from the entrance panel housing, and a clamping mechanism clamping the power meter base, the entrance panel housing and the body together in an assembly configuration where the first wiring through-hole and the second wiring through-hole are in register with one another.

In still another aspect, a connecting system for connecting a power meter base to an entrance panel housing in an electrical service assembly includes a one-piece molded body having a wiring through-hole formed therein for passing wiring between the entrance panel housing and the power meter base, the wiring through-hole defining an axis. The body further includes a first axial body segment having a plurality of peripheral edges forming a rectangular shape and a first surface lying in a plane oriented normal to the axis which is configured to abut the entrance panel housing, and a second axial body segment having a plurality of inboard edges also forming a rectangular shape and a second surface lying in a second plane oriented normal to the axis and being configured to abut the power meter base. The body is further adapted to mount the power meter base to the entrance panel housing and includes an axial thickness between the first surface and the second surface for spacing the power meter base from the entrance panel housing when mounted thereon. The body further includes a land area extending between the plurality of peripheral edges and the plurality of inboard edges which lies in the third plane located between and parallel to each of the first plane and the second plane.

DETAILED DESCRIPTION

Figure 1:
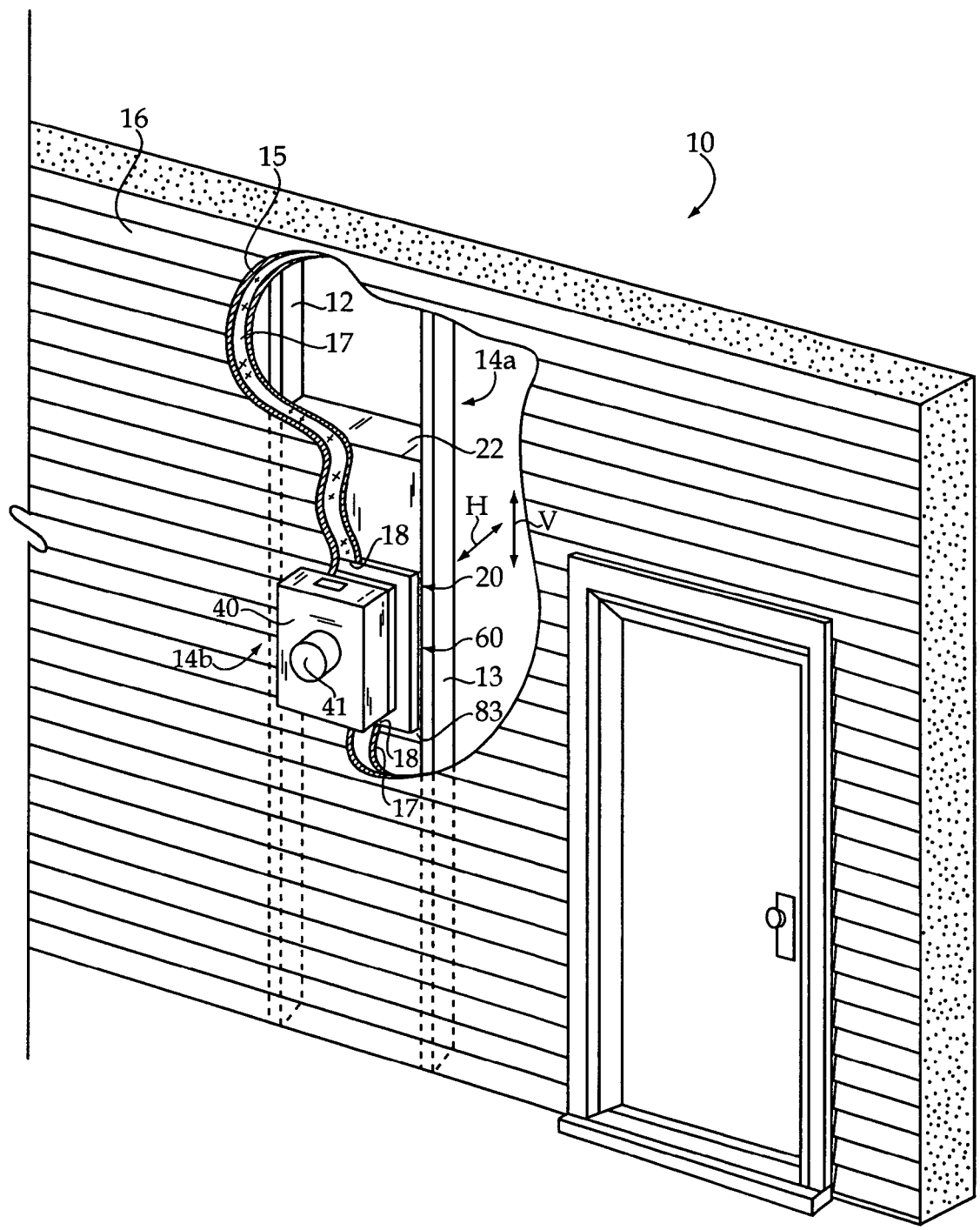
FIG. 1 is a diagrammatic illustration of a building structure wall, partially in cut-away, according to one embodiment.

Referring to FIG. 1, there is shown a building structure wall 10 such as might be used to form a part of a residential home, business, apartment building, or any of wide variety of other permanent structures. Wall 10 may include a first elongate structural member 12 and a second elongate structural member 13 spaced from first elongate structural member 12 and oriented parallel therewith. First elongate structural member 12 and second elongate structural member 13 define a vertical direction, and would typically be oriented vertically with respect to the ground. Line V denotes the vertical direction. Elongate structural members 12 and 13 may be conventional wooden studs, such as 2' by 4's, commonly used in the construction industry. Steel studs, composites, etc. might also be used. A backing material 17 such as conventional sheathing may be positioned in wall 10 and coupled with elongate structural members 12 and 13 in a conventional manner. Those skilled in the art will be quite familiar with chip board, plywood, and other materials commonly suitable for use as backing material 17. A facing material 16, such as conventional siding may be positioned upon backing material 17 in a conventional manner. Other materials, such as vapor barriers might be provided to form a layer between or behind materials 15 and 17. Facing material 15 may include an outer surface 16 of wall 10. Wall 10 may include a first side 14a, which may correspond to an interior side of a building structure of which wall 10 forms a part, and a second side 14b which may correspond to an outer side of the building structure of which wall 10 forms a part. In other instances, wall 10 might include an interior wall, partitioning rooms of a building structure, such as a building structure having rooms used for different purposes or used by different tenants, etc.

An electrical service assembly 20 may be positioned between first elongate structural member 12 and second elongate structural member 13 and extends in a horizontal direction between first side 14a of wall 10 and second side 14b of wall 10. Second side 14b is opposite first side 14a, hence electrical service assembly 20 would project horizontally all the way through wall 10, the significance of which will be further apparent from the following description. Electrical service assembly 20 may include an entrance panel housing 22 mounted to at least one of first elongate structural member 12 and second elongate structural member 13. Electrical service assembly 20 may further include a power meter base 40 which includes a power meter 41, and a connecting system 60 which mounts power meter base 40 to entrance panel housing 22.

Figure 2:
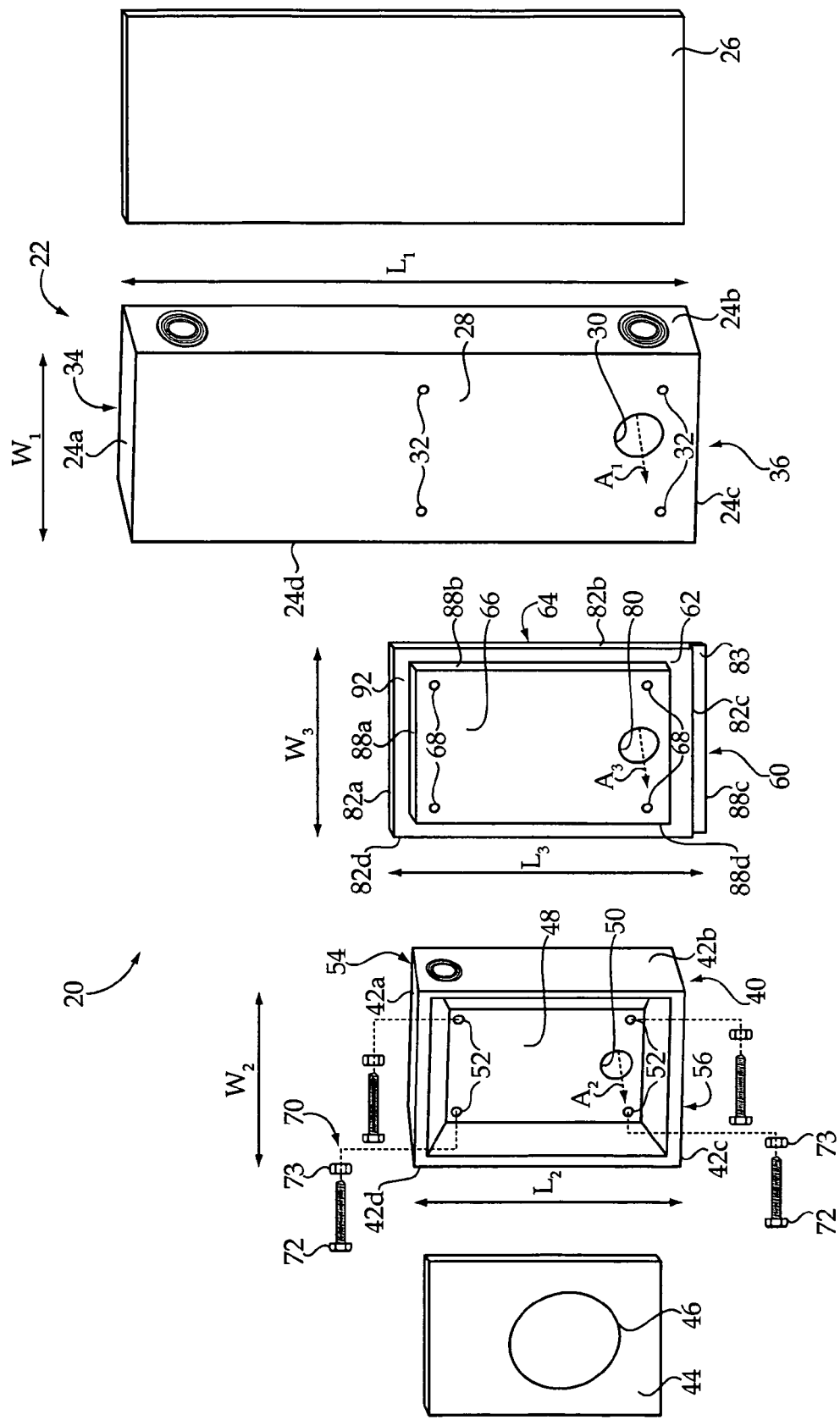
FIG. 2 is an exploded view of an electrical service assembly according to one embodiment.

Referring also to FIG. 2, there is shown an exploded view of electrical service assembly 20. Entrance panel housing 22 may include an entrance panel cover 26 which, when electrical service assembly 20 is mounted in wall 10, is positioned on first side 14a of wall 10. Power meter base 40 may include a base cover 44 which, when electrical service assembly 20 is mounted in wall 10, is positioned on the second side 14b of wall 10. Base cover 44 may define a meter opening 46, through which meter 41 projects when mounted therein. Entrance panel housing 22 may further include a housing length $L_1$, and a housing width $W_1$ which is oriented normal to housing length $L_1$, and is less than housing length $L_1$. Entrance panel housing 22 may further include a first housing end 34, a second housing end 36, and housing length $L_1$ may extend between housing ends 34 and 36. Entrance panel housing 22 may further include a plurality of entrance panel sidewalls 24a-d, and an entrance panel back wall 28 having a first wiring through-hole 30 formed therein. Wiring through-hole 30 may include a circular wiring through-hole defining a first axis $A_1$. In one embodiment, wiring through-hole 30 may be centered in a side-to-side manner in entrance panel back wall 28, such that width $W_1$ as defined between entrance panel sidewall 24b and entrance panel sidewall 24d is bisected by axis $A_1$. A plurality of apertures 32 may be formed in entrance panel back wall 28, the significance of which will be apparent from the following description.

Power meter base 40 may include a plurality of base sidewalls 42a-d, and a base back wall 48. Power meter base 40 may further include a base width $W_2$ extending between base sidewalls 42d and 42b, and a base length $L_2$ extending between base sidewalls 42a and 42c. Base length $L_2$ may also be understood to extend between a first base end 54 and a second base end 56. Base width $W_2$ may be less than base length $L_2$ and be oriented normal to base length $L_2$. Base back wall 48 may define a second wiring through-hole 50, comprising a circular wiring through-hole, and defining a second axis $A_2$ which bisects base width $W_2$.

Also shown in FIG. 2 is connecting system 60. Connecting system 60 may connect power meter base 40 to entrance panel housing 22, and may include a body 62 having a first surface 66 abutting base back wall 48 and a second surface 64 opposite first surface 66 which abuts entrance panel back wall 28 when electrical service assembly 20 is assembled. Body 62 may further include a thickness between first surface 66 and second surface 64 whereby body 62 spaces power meter base 40 from entrance panel housing 22 when assembled therewith, and further described herein. Connecting system 60 may further include a clamping mechanism 70 clamping power meter base 40, entrance panel housing 22 and body 62 together in an assembly configuration where first wiring through-hole 30 and second through-hole 50 are in register with one another. Power meter base 40 may include a set of apertures formed in base back wall 48 which are each in register with one of apertures 32 of entrance panel housing 22 when electrical service assembly 20 is assembled. Body 62 may, in one embodiment, include a molded one-piece body formed of a suitable injection moldable or compression moldable plastic material, for example, and may include a third set of apertures 68 formed therein. Each of apertures 68 may extend in an axial direction through body 62 between first surface 66 and second surface 64. In one embodiment, clamping mechanism 70 may include a set of fasteners 72 and a set of corresponding nuts 73. Fasteners 72 may each extend through one of apertures 52, 68 and 32, to be secured via nuts 73. In other embodiments, a different clamping mechanism might be used.

Figure 3:
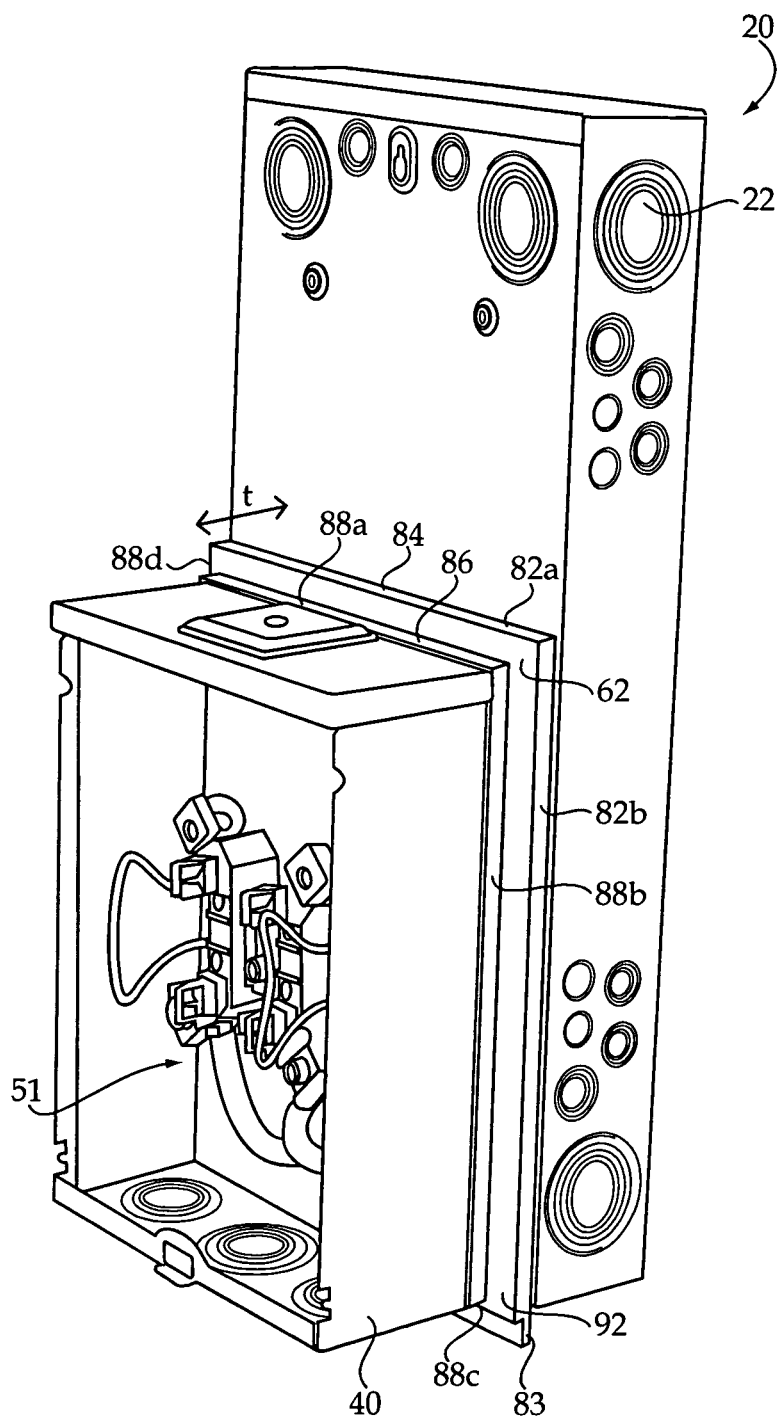
FIG. 3 is a diagrammatic illustration of an assembled electrical service assembly according to one embodiment.

Body 62 may be uniquely configured to securely mount power meter base 40 to entrance panel housing 22 in cooperation with clamping mechanism 70 such that power meter base 40 and entrance panel housing 22 may be provided as a preassembled unit, which can be installed between elongate structural members 12 and 13 as shown in FIG. 1. Body 62 may further include a third wiring through-hole 80 formed therein, also a circular wiring through-hole, which defines a third axis $A_3$. Referring also to FIG. 3, there is shown electrical service assembly 20 in an assembled configuration. It may be noted that body 62 may include a plurality of peripheral edges, identified via reference numerals, 82a-d, defining a rectangular shape. Body 62 may also include a plurality of inboard edges, identified via reference numerals 88a-d, and also defining a rectangular shape. In one embodiment, body 62 may include a first axial body segment 84 whereupon peripheral edges 82a-d are located, and a second axial body segment 86 whereupon inboard edges 88a-d are located. FIG. 3 also illustrates the axial thickness t, relative to axis $A_3$, whereby power meter base 40 is spaced from entrance panel housing 20 by body 62. Each of axial body segments 84 and 86 comprises a portion of thickness t. It may be noted that spacing of power meter base 40 from entrance panel housing 22 allows power meter base 40 to be positioned appropriately in wall structure 10 of FIG. 1 such that a distance between power meter base 40 and entrance panel housing 22 corresponds to a thickness of facing material 15 and backing material 17. In one embodiment, an axial thickness of first axial body segment 84 may be substantially equal to a thickness of backing material 17. An axial thickness of second axial body segment 86 may be substantially equal to a thickness of facing material 15. An opening 18, shown in FIG. 1 in backing material 17 may be cut to accommodate first axial segment 84 when installing electrical service assembly 20 in wall 10. Opening 18 may have a rectangular shape matched to the rectangular shape of axial body segment 84. Facing material 15 may be applied to wall 10 such that it covers land area 92 to provide an aesthetically pleasing appearance to the finished wall 10.

Also shown in FIG. 3 is an electrical wiring assembly 51. In one embodiment, electrical wiring assembly 51 may be installed in electrical service assembly 22 when the various components are assembled together. Accordingly, the labor normally required to install electrical wiring in and between a power meter base and entrance panel housing is not necessary, as electrical service assembly 20 may be provided as a preassembled unit which merely needs to be mounted to at least one of elongate structural members 12 and 13 to fully install a ready-to-go assembly in wall 10. In the embodiment described above, connecting system 60 is configured such that axis $A_1$ of first wiring through hole 30 is co-linear with axis $A_2$ of second wiring through hole 50. Wiring through-hole 80 may also be in register with through-holes 30 and 50, and may further be positioned such that axis $A_3$ is co-linear with axis $A_1$ and axis $A_2$.

Returning to FIG. 2, it may be noted that body 62 may include a body length $L_3$ extending between peripheral edge 82a and peripheral edge 82c. A body width $W_3$ may extend between peripheral edge 82d and peripheral edge 82b. Body length $L_3$ may be aligned with and parallel to housing length $L_1$ and also aligned with and parallel to base length $L_2$. As noted above, body 62 may also include a plurality of inboard edges 88a-d. A second body width corresponding to a width of second axial body segment 86 between inboard edge 88b and inboard edge 88d, may, in one embodiment, be equal to base width $W_2$. A second body length corresponding to a length of second axial body segment between inboard edges 88a and 88c may be equal to base length $L_2$. It may further be noted that body 62 includes a stepped profile between first surface 66 and second surface 64, corresponding to the different lengths and widths of axial body segments 84 and 86.

Figures 4, 5:
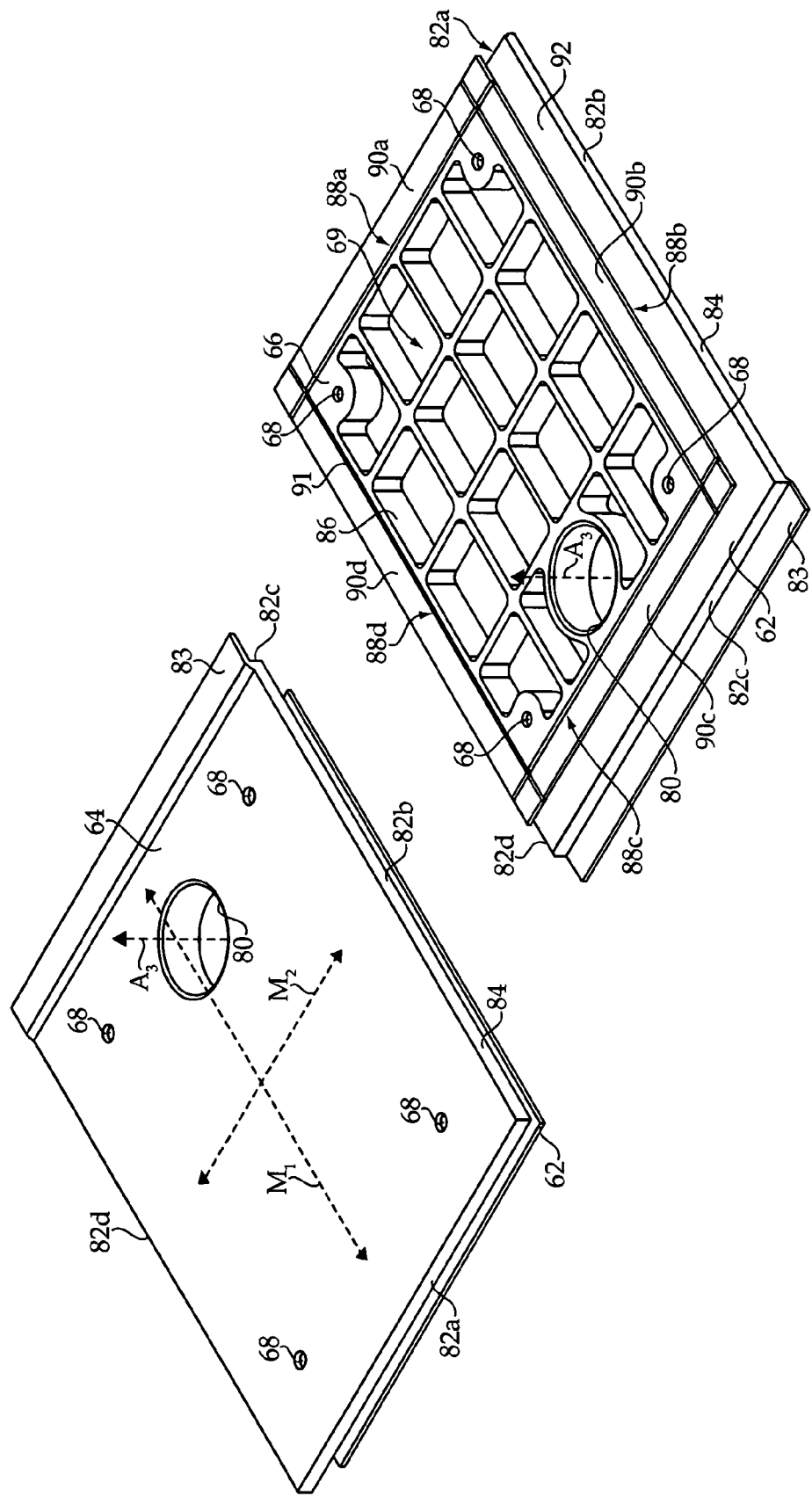
FIG. 4 is a diagrammatic illustration in one view of a portion of a connecting system according to one embodiment.
FIG. 5 is a diagrammatic illustration in another view of the portion of the connecting system shown in FIG. 4.

Turning now to FIGS. 4 and 5, there are shown two different views of body 62. In particular, in FIG. 4 second surface 64 faces upward whereas in FIG. 5 first surface 66 faces upward. It may be noted that second surface 64 and first surface 66 each lie generally in parallel but spaced apart planes. Also evident in FIG. 5 are a plurality of breakaway flanges 90a-c projecting outwardly from each of inboard edges 88a-d. Flanges 90a-c may or may not be used in a practical implementation strategy. A groove 91 separates each of inboard edges 88a-d from a corresponding breakaway flange 90a-d. When body 62 is assembled with other components of electrical service assembly 20, flanges 90a-d may be left in place, for instance where conventional siding such as vinyl or aluminum siding is used, or flanges 90a-d may be broken away to accommodate a relatively thicker facing material about the corresponding power meter based 40, such as a brick facing material. Blocks (not shown) might be positioned between power meter base 40 and body 62 to increase the spacing therebetween to accommodate a relatively thicker facing material such as brick. Thus, where siding is used, for example, edges of the siding may be fitted behind breakaway flanges 90a-d and may butt against inboard edges 88a-d, with edges of the siding being partially covered by breakaway flanges 90a-d. Where brick, etc., is used, breakaway flanges 90a-d may be broken off by breaking or cutting them from the other parts of body 62 along groove 91.

Also shown in FIG. 5, and identified elsewhere in the other drawings discussed herein, is a mounting flange 83 which extends along and depends from peripheral edge 82c. In one embodiment, mounting flange 83 may be used to assist in positioning electrical service assembly 20 within a wall such as wall 10 and prior to fastening entrance panel housing 22 to the wall structure. In particular, electrical service assembly 20 may be positioned such that peripheral edge 82c rests on an edge of backing material 17, supporting the weight of electrical service assembly 20 while fasteners, etc. are used to connect entrance panel housing 22 to one or both of elongate structural members 12 and 13. Thus, mounting flange 83 may be positioned inwardly of backing material 17 similar to that which is shown in FIG. 1, to assist in positioning/supporting assembly 20 while being secured in place.

As discussed above, first surface 66 may lie in a first plane which may be normal to axis $A_3$, the first surface being configured to abut entrance panel housing 22, and in particular contacting back wall 28. Axial body segment 86 may include first surface 66, as well as inboard edges 88a-d. As also shown in FIG. 5, axial body segment 86 may include molded or machined-in webbing 69, resulting in a relatively lightweight but structurally robust configuration. Axial body segment 84 may include peripheral edges 82a-d, and also include surface 64, which lies in another plane also oriented normal to axis $A_3$. Surface 64 may be configured to abut power meter base 40, and in particular contacts housing back wall 28. Land area 92 may extend between peripheral edges 82a-d and inboard edges 88a-d. Land area 92 may lie in a third plane which is located between and parallel to each of the first plane corresponding to surface 66 and the second plane corresponding to surface 64. It may further be noted that aperture 68 are arranged in a rectangular pattern, and positioned inboard of inboard edges 88a-d. The rectangular pattern defined by aperture 68 may define a major axis M₁ and a minor axis M₂. In one embodiment, through-hole 80 may be offset from a center of the rectangular pattern defined by aperture 68, such that axis A₂ intersects major axis M₁ but does not intersect minor axis M₂, as illustrated in FIG. 4.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent from an examination of the attached drawings and appended claims.

I claim:

1. An electrical service assembly comprising:
    an entrance panel housing adapted to mount the electrical service assembly to a building structure wall, the entrance panel housing having a plurality of parallel entrance panel sidewalls, an entrance panel cover, an entrance panel back wall positioned opposite the entrance panel cover such that the parallel entrance panel sidewalls each extend between the entrance panel cover and the entrance panel back wall, and a first wiring through-hole formed in the entrance panel back wall;
    a power meter base including a plurality of parallel base sidewalls, a base cover defining a meter opening, a base back wall positioned opposite the base cover and a second wiring through-hole formed in the base back wall; and
    a connecting system connecting the power meter base to the entrance panel housing, the connecting system including a body having a first surface abutting the base back wall, a second surface opposite the first surface and abutting the entrance panel back wall and a thickness between the first surface and the second surface whereby the body spaces the power meter base from the entrance panel housing;
    the connecting system further including a clamping mechanism clamping the power meter base, the entrance panel housing and the body together in an assembly configuration where the first wiring through-hole and the second wiring through-hole are in register with one another.

2. The electrical service assembly of claim 1 wherein the entrance panel housing includes a first set of apertures formed in the entrance panel back wall, wherein the power meter base includes a second set of apertures formed in the base back wall and each being in register with one of the first set of apertures, and wherein the clamping mechanism includes a plurality of fasteners each extending through one of the first set of apertures and one of the second set of apertures.

3. The electrical service assembly of claim 2 wherein the body further includes a molded one-piece body having a third set of apertures formed therein, each of the apertures of the third set extending through the body between the first surface and the second surface and receiving one of the plurality of fasteners.

4. The electrical service assembly of claim 3 wherein:
    the entrance panel housing includes a first housing end, a second housing end, a housing length extending from the first housing end to the second housing end and a housing width which is less than the housing length and is oriented normal to the housing length, the first wiring through-hole defining a first axis which bisects the housing width; and
    the power meter base includes a first base end, a second base end, a base length extending from the first base end to the second base end and a base width which is less than the base length and is oriented normal to the base length, the second wiring through-hole defining a second axis which bisects the base width and is co-linear with the first axis.

5. The electrical service assembly of claim 4 wherein the body defines a third wiring through-hole defining a third axis which is co-linear with the first axis and the second axis.

6. The electrical service assembly of claim 5 wherein the body includes a plurality of peripheral edges forming a rectangular shape and includes a body length extending between a first and a second of the peripheral edges which is aligned with the housing length and aligned with the base length, the body further including a body width extending between a third and a fourth of the peripheral edges which is aligned with the housing width and aligned with the base width, the body width being equal to the housing width.

7. The electrical service assembly of claim 6 wherein the body further includes a first axial body segment comprising a first portion of the thickness of the body and including the first surface and the plurality of peripheral edges, and a second axial body segment comprising a second portion of the thickness of the body and including the second surface and a plurality of inboard edges, the plurality of inboard edges forming a rectangular shape and the second axial body segment including a second body width aligned with the housing width and aligned with the base width which is equal to the base width.

8. The electrical service assembly of claim 1 wherein the body further includes a third wiring through-hole formed therein which is coaxial with the first wiring through-hole and coaxial with the second wiring through-hole.

9. The electrical service assembly of claim 8 wherein the third wiring through-hole defines an axis, the body further including a first axial body segment which includes the first surface and comprises a first portion of the thickness of the body and a second axial body segment which includes the second surface and comprises a second portion of the thickness of the body, and a stepped profile between the first surface and the second surface.

10. The electrical service assembly of claim 9 wherein the first axial body segment includes a plurality of peripheral edges and the second axial body segment includes a plurality of inboard edges, and wherein the body further includes a land area extending between the plurality of peripheral edges and the plurality of inboard edges and lying in a plane oriented normal to the axis.

* * * * *